United States Patent

Algers et al.

Patent Number: 5,540,449
Date of Patent: Jul. 30, 1996

[54] SHAFT SEALING ARRANGEMENT HAVING FLUID FLUSHING MEANS

[75] Inventors: Bengt Algers, Nol; Leo Kotkaniemi, Älvängen, both of Sweden

[73] Assignee: ADS Pump Production AB, Molndal, Sweden

[21] Appl. No.: 234,668

[22] Filed: Apr. 28, 1994

[30] Foreign Application Priority Data

Apr. 28, 1993 [SE] Sweden .................................. 9301425

[51] Int. Cl.⁶ .................................................. F16J 15/447
[52] U.S. Cl. .................................. 277/65; 277/71; 277/85; 277/74
[58] Field of Search .............................. 277/59, 65, 135, 277/59, 67, 71, 74, 79, 22, 85

[56] References Cited

U.S. PATENT DOCUMENTS

| | | | |
|---|---|---|---|
| 3,218,085 | 11/1965 | Grace | 277/59 |
| 3,895,811 | 7/1975 | Richard, Jr. et al. | 277/67 |
| 3,943,717 | 3/1976 | Schexnayder | 277/59 |
| 4,619,458 | 10/1986 | Mitumaru | 277/24 |
| 4,992,023 | 2/1991 | Baker et al. | 277/67 |

*Primary Examiner*—Scott W. Cummings
*Attorney, Agent, or Firm*—Cohen, Pontani, Lieberman, Pavane

[57] ABSTRACT

Apparatus for providing a mechanical planar seal, as for example for use with a centrifugal pump having a rotating shaft, includes a primary seal formed of a movable first part rotatable with the shaft and a fixed second part or seat, a secondary seal axially spaced along the shaft from the primary seal, an inlet for flushing liquid, an outlet for the flushing liquid and for pump medium that leaks through the primary seal, a collection chamber defined between the primary and secondary seals for flushing liquid and leaking pump medium, and a drain passage connecting the collection chamber and outlet. The collection chamber is divided into at least two portions in liquid communication with each other and with the drain passage by at least one predeterminately-configured wall so as to assure that the flushing liquid is maintained between the primary and secondary seals for an extended period of time for advantageously efficient use of the flushing liquid in lubrication and cooling of the primary seal.

5 Claims, 2 Drawing Sheets

SHAFT SEALING ARRANGEMENT HAVING FLUID FLUSHING MEANS

FIELD OF THE INVENTION

The present invention relates to mechanical seals and, more particularly, to mechanical planar fluid seals for centrifugal pumps having cooperating sealing surfaces that are cooled by the pumped medium or by a supplied liquid and wherein the medium or liquid forms a film between the opposed, relatively moving sealing surfaces so as to lubricate and avoid contact between the surfaces.

BACKGROUND OF THE INVENTION

Centrifugal pumps of the type with which it is generally contemplated that the improved sealing arrangements of the present invention will be employed typically include a radially-outer fixed pan or seat and a radially-inner part or element that operatively rotates with the pump shaft and relative to the seat. Mechanical planar seals are developed by directing the pumped medium, or another supplied liquid, into the spacing between the opposed, radially inner and outer member surfaces, and allowing a small amount of the medium or liquid to flow and leak out from between the sealing surfaces. This leakage is not normally visible as the liquid evaporates; however, the result of such leakage is that impurities in the liquid, such as (and especially) crystallized salts, accumulate outside of and adjacent to or around the seal. Such accumulations are accompanied by a notably increased risk that the fixed surface will be unintendedly contacted by or clutched to the rotating surface and thereby caused to rotate with the shaft, or that the sealing surfaces will be undesirably forced away from each other thus resulting in rapid leakage or loss of the pumped medium or supplied liquid with which the seal is developed and maintained. In order to prevent such occurrences the outside or exterior side of the seal is flushed or cleaned with a so-called quench or flushing liquid, typically comprised of pure water. As this quench-water or liquid cannot be permitted to uncontrollably splash out or away from the area that it is intended to clean, the sealing assembly is generally additionally provided with a secondary seal which, in its most simplified form, may be implemented by a radial sealing ring. Labyrinth seals and so-called lip seals and pack boxes with box braidings or graphite rings are also sometimes employed to form the secondary seal. In any event, all of these sealing rings and pack boxes and the like require a continuous supply of liquid for lubrication and cooling but will nevertheless wear out and begin to leak after use for only a relatively short period of time.

The secondary seal may also comprise a further mechanical planar seal, thus providing a double mechanical planar seal arrangement. Such double mechanical planar seals are significantly more costly to implement and their design often requires maintenance of an over-pressure condition in the seal housing in which it is located. As a consequence, any shortfall in the supply of sealing liquid to the sealing surfaces and structures will prove catastrophic as the inner seal may be forced out, with attendant leakage of the pumped medium, and the outer seal will run dry and overheat in very short order.

SUMMARY OF THE INVENTION

In view of the aforedescribed problems and deficiencies of prior art seals it is the primary objective of the present invention to provide a mechanical planar sealing arrangement that both requires only very small amounts of flushing or quench liquid or water to lubricate and cool the seal(s) and permits ready discharge of relatively large amounts of the sealing liquid or pumped medium per time unit should the planar seal(s) start to leak or deteriorate or collapse.

This objective is advantageously achieved in accordance with the invention by an arrangement in which the flushing liquid remains between the primary and secondary seals for an extended amount or period of time and is therefore used with greatly enhanced efficiency. Such an arrangement, if carefully controlled, requires very little quench water; indeed, the attainable savings of water through continuous quench can be as high as approximately 75 to 90% of that employed by prior art methods and arrangements. Where a continuous quench is not required as, for example, to flush away crystallized salt and the like on the outside of the planar seal, it is possible to flush at intervals of, e.g., 10 seconds every second minute and thereby further conserve sealing water. Moreover, in accordance with the invention the frequency of such intermittent flushing can be reduced to on the order of 10 seconds every tenth hour which translates to a savings of approximately 99.97% of the quench liquid required by the prior art.

In various preferred embodiments of the invention the sealing arrangement is implemented in the form of a sealing dog defined by a housing, a primary seal formed of a first part rotatable with a shaft of a pump or the like .with which the dog is utilized and a second fixed part or seat mounted on the housing, a secondary seal, an inlet for flushing liquid, a liquid collection chamber defined between the primary and secondary seals, a liquid outlet, and a drain passage connecting the chamber and the outlet. The collection chamber is divided into at least two separate portions by at least one dividing wall, each of the chamber portions being connected for liquid communication with the drain passage. The same sealing dog constructed in accordance with the invention may advantageously be employed in pump environments with or without quench liquid requirements, as a result of which fewer different types of spare parts for effecting mechanical planar seals need be maintained. Moreover, the inventive sealing dog has no moving parts and no elements subject to rapid deterioration or wear.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF THE DRAWINGS

In the drawings, wherein like reference characters denote similar elements throughout the several views:

FIG. 2b is a radial cross-sectional view taken along the lines A—A of FIG. 2a;

FIG. 3b is a radial cross-sectional view taken along the lines A—A of FIG. 3a;

FIG. 5b is a radial cross-sectional view taken along the lines A—A of FIG. 5a.

DETAILED DESCRIPTION OF THE PREFERRED EMBODIMENTS

Figure 1:
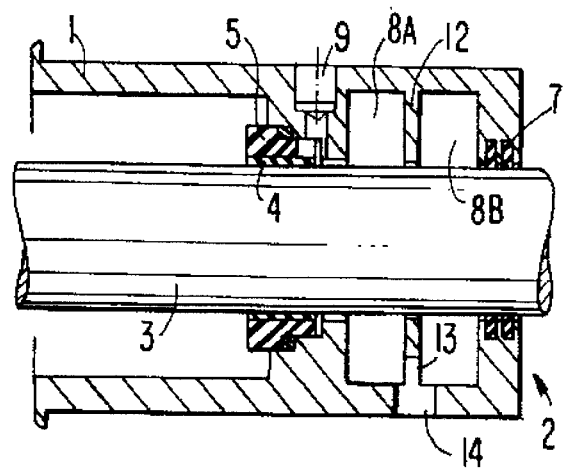
FIG. 1 is an axial cross-sectional side view of a sealing dog constructed in accordance with a first embodiment of the present invention.

Depicted in FIG. 1 is a sealing dog, identified by the general reference numeral 2, constructed in accordance with a first embodiment of the present invention. The dog 2 includes a seal box or housing 1 within which a shaft 3, as for example of a centrifugal or other pump or like device, is axially rotatable relative to the fixed housing during normal operation of the pump or device. The shaft 3, as should be apparent to those knowledgeable in this and related arts, is not an element of the dog 2 or sealing arrangements of the invention but, rather, of the pump or other device with which the inventive dog or sealing arrangement is operatively employed. A primary mechanical planar seal is formed by a first part or member 4 that rotates in conjunction with the shaft 3 and a second fixed or non-rotatable part or seat 5 that is carried by the housing 1. A secondary seal 7, here by way of example in the form of a labyrinth seal, is mounted to the housing 1 further downstream of or axially along the shaft 3. With the dog 2 operatively positioned about a shaft 3, the primary seal is thus located at a first axial position along the shaft and the secondary seal 7 is located at a second-position along the shaft and axially spaced apart from the said first position of the primary seal.

The housing 1 is configured so as to define a collection chamber 8 for the flushing or quench liquid, typically water, that is supplied or applied to the seals through an inlet 9 defined in the housing 1. The chamber 8 also collects any of the fluid or medium or the like that is being pumped or displaced by the pump or other rotatable shaft-incorporating device with which the dog 1 is operatively employed and that may leak out along the shaft 3 through the primary planar seal defined by the parts or members 4, 5. In accordance with the invention, the collection chamber 8 in the FIG. 1 embodiment is divided into two parts or portions 8a, 8b by a common dividing wall 12. The two chamber portions 8a, 8b share a common drainage passage 13 and a common outlet 14 defined in and through the housing 1 for discharging the collected quench liquid and the like from the chamber 8.

As will become apparent as this description proceeds, it is within the intended scope and contemplation of the invention that the dog 2 may incorporate more than two chamber portions and/or more than a single drainage passage and/or outlet, as for example through suitable configuration of the housing 1 and/or wall(s) 12. The provision or inclusion of a collection chamber 8 divided into a multiplicity of portions by one or more dividing walls 12, in conjunction with the associated drainage passage(s) 13 and outlet(s) 14, is effective to prevent an oversupply of liquid to the secondary seal 7 which is capable of accepting only marginal amounts of quenching liquid or water without significant leakage. By virtue of the teachings and arrangements of the invention at least the main portion of the liquid that flows along the shaft 3 from the inlet 9 and, perhaps, the pumped medium unintendedly entering the interior portion of the dog 2 through a leaking primary planar seal 4, 5, is prevented from continued flow downstream to the secondary seal 7 and, instead, is directed for discharge through the outlet(s) 14 by way of the drainage passage(s) 13. The first-embodiment arrangement shown in FIG. 1 is particularly effective to prevent, or at the very least significantly reduce, this so-called direct leakage through the secondary seal 7.

At high rotational speeds of the shaft 3 there occurs an additional form of leakage, caused by a phenomenon known as co-rotation. In co-rotation, at least some of the leaking medium and/or quench liquid rotates with the shaft (shaft lining) and, flowing along the shaft at high speed, quickly passes beyond the outlet; this leaking medium and/or quench liquid rotating with and along the shaft rapidly reaches the secondary seal 7 and passes therethrough rather than, as intended, exiting the housing interior through the outlet 14. The additional embodiments of the inventive sealing dog 2 hereinafter described are specifically designed and constructed to obviate this additional problem by causing the co-rotating liquid and/or medium and the like to flow outwardly through the outlet 14 as generally intended.

Figure 2A:
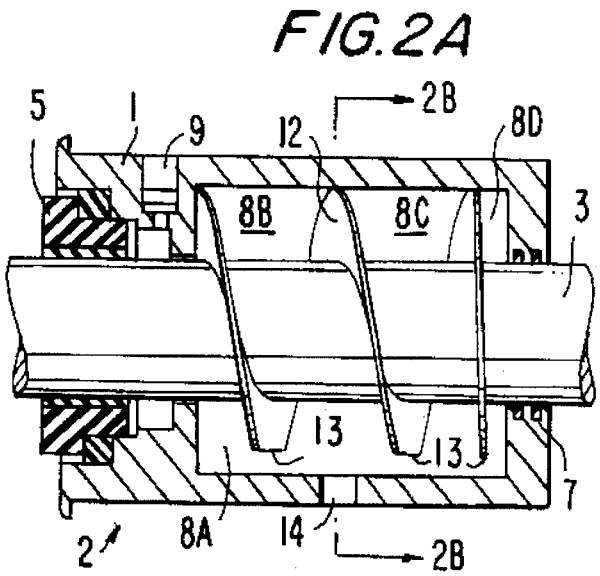
FIG. 2a is an axial cross-sectional side view similar to FIG. 1 and depicting a second embodiment of a sealing dog.
Figure 2B:
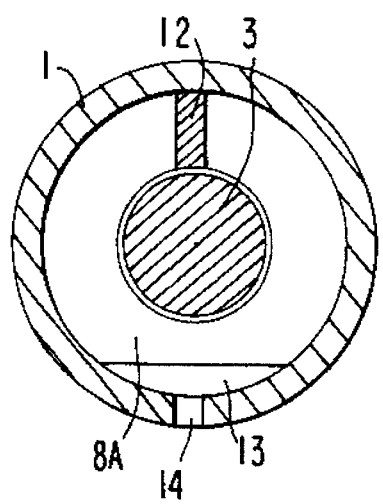

In the second embodiment of the dog 2 depicted in FIGS. 2a and 2b, the dividing wall 12 has the configuration of a relatively tight or constricted screw-like spiral that extends through substantially the entire axial and radial extent of the liquid collection chamber 8. The dividing wall 12 closely surrounds the shaft 3 with only a relatively small spacing defined therebetween and divides the liquid collection chamber 8 into four distinct parts 8a, 8b, 8c, 8d essentially separate from one other. The wall 12 is also closely joined to the circumferential wall that radially bounds the chamber 8 of the seal box or housing 1 except in that radial area located closest to the outlet 14 at which, in conjunction with the housing 1, the dividing wall forms three drainage passages 13. This embodiment of the inventive sealing arrangement is operatively effective to prevent, or to at least notably reduce, both direct and co-rotation leakage.

Figure 3A:
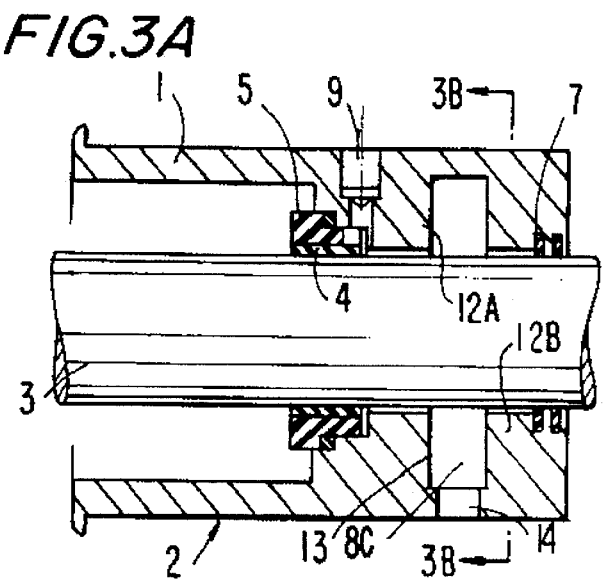
FIG. 3a is an axial cross-sectional side view similar to FIG. 1 and depicting a third embodiment of a sealing dog.
Figure 3B:
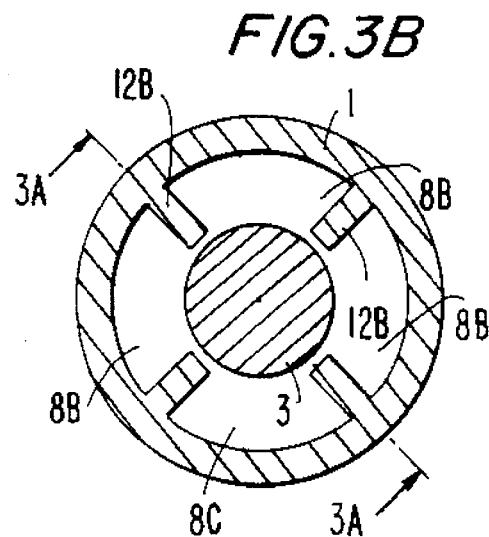

FIGS. 3a and 3b illustrate a third embodiment of a sealing dog constructed in accordance with the present invention and which is particularly effective at preventing co-rotation leakage. In this third embodiment, the dividing wall 12 is defined by four pairs of bars. One bar 12a of each said pair is situated axially within and the other bar 12b of each pair is axially outside (or at the axially-downstream boundary) of a central portion 8c of the collection chamber. The bars 12b combinationally and together define and delimit four collection chamber parts 8b, all of which are directly connected to and in direct fluid communication with the larger central portion 8c. In the same manner the four axially inner (or upstream) bars 12a combinationally and together define and delimit four other chamber parts, all of which are directly connected to and in direct fluid communication with the central portion 8c.

It will be appreciated that the number of pairs of the bars 12a, 12b provided in the dog 2 may alternatively, and as a general matter of design choice, be less than or greater than the four disclosed in the embodiment of FIGS. 3a and 3b. It is also within the intended scope and contemplation of the invention that the bars 12 may be angled relative to the axial planes through the shaft 3 rather than, as shown in FIG. 3b, being situated in such planes.

Figure 4:
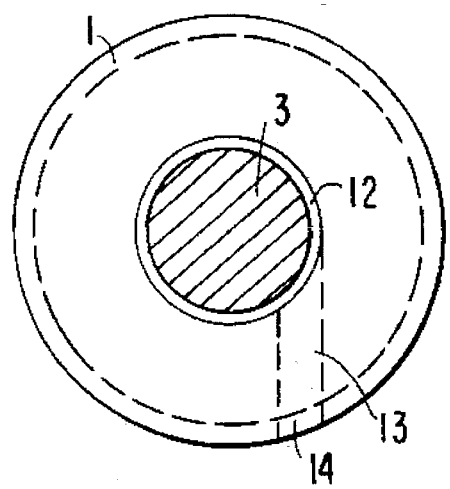
FIG. 4 is a radial cross-sectional view of a fourth embodiment of a sealing dog constructed in accordance with the invention.

Another arrangement for preventing co-rotation leakage is depicted in FIG. 4 which shows a cross-sectional view through a fourth embodiment of a sealing dog constructed in accordance with the invention. In the section of FIG. 4, which is taken through the axially inner part 8a of the collection chamber, the chamber 8 is divided into two parts by a radially-extending dividing wall 12—similar to the dividing wall arrangement of the earlier-described embodiment of FIG. 1. In the FIG. 4 form of the inventive dog 2, however, the outlet 14 and the drainage passage 13 are located in a vertical (in the Figure) plane oriented parallel to the shaft 3; that plane lies parallel to a radial or diametrical plane of the chamber but is transversely displaced or offset or eccentric relative thereto in the direction opposite the rotational direction of the shaft 3. The drainage passage 13 and outlet 14 open at the lower, or radially outer, part of the housing, and the dividing wall 12 is wholly or partially broken by the drainage passage and outlet. In an alternative modification of the FIG. 4 arrangement, the drainage passage and outlet may be replaced or further provided with outlets positioned at the respective part(s) of the collection chamber and directed in the same manner. It is also within the intended scope of the invention that the drainage passage 13 and outlet 14 may form a larger or smaller angle with both the aforementioned diametric plane and the plane of the Figure.

Figure 5A:
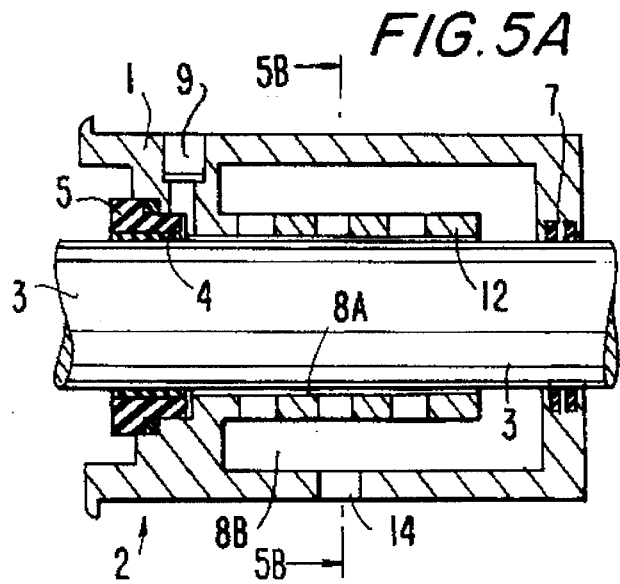
FIG. 5a is an axial cross-sectional side view similar to FIG. 1 and depicting a fifth embodiment of a sealing dog.
Figure 5B:
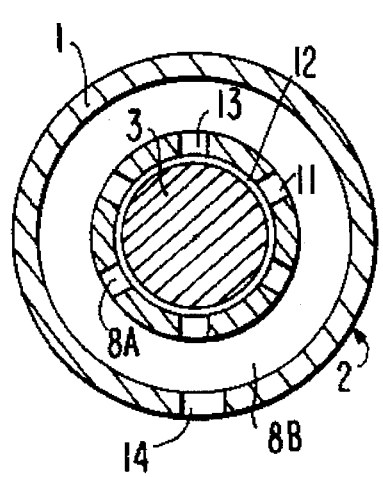

A still further embodiment of a sealing dog 2 that is operatively effective for counteracting primarily co-rotation leakage is shown in FIGS. 5a and 5b. The dividing wall 12 in these Figures has a substantially tubular configuration and closely surrounds the shaft 3 so as to define a narrow, as by way of example approximately two mm wide, cylindrical ring-shaped space that forms an inner portion 8a of the collection chamber and to which the inlet 9 directs the quench liquid. The dividing wall 12 is broken by several, or an otherwise-defined plurality of, preferably radial holes or slits 11 that connect the inner portion 8a to the radially-outer portion 8b of the collection chamber, The outlet 14 is located in the lower part or region of the chamber portion 8b. In an optional modification of the FIG. 5 arrangement, the illustrated dividing wall 12 may be supplemented by one or more additional, similarly-tubular dividing walls defined coaxially about and radially-outwardly beyond the shaft 3 and depicted wall 12 so as to further divide the collection chamber portion 8b into several smaller portions.

Figure 6:
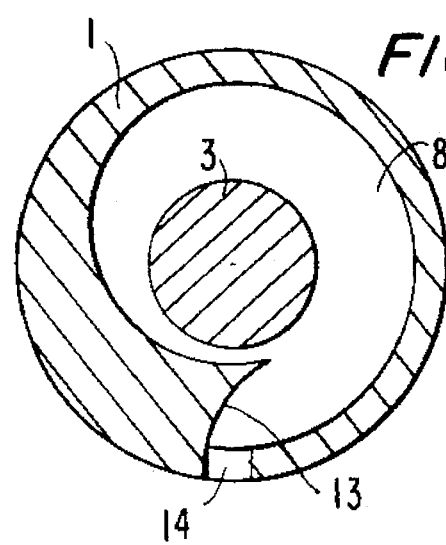
FIG. 6 is a radial cross-sectional view of a sixth embodiment of a sealing dog constructed in accordance with the invention.

Co-rotation leakage may also be prevented by the sixth embodiment illustrated in cross-section in FIG. 6. There the collection chamber 8 has a configuration that is defined by a dividing wall that is formed as the radially peripheral wall boundary of the chamber 8 and that is integral with and radially-inwardly depends from the dog housing 1. The integral wall has the general shape of a spiral with, at least initially, a radially-increasing cross-sectional area. The collection chamber 8 extends along the axial direction or elongation of and surrounds the shaft 3, and peripherally terminates in the radial direction in a concave curved wall that delimits and defines a drainage passage 13 bounded by an concavely or arcuately-curved wall and leading to an outlet 14.

It should by now be recognized and appreciated that the sealing arrangements of the present invention advantageously provide a collection chamber that collects and accommodates the quench water or liquid without leakage, without movable parts and without elements that are likely to wear out. The collection chamber accepts larger quantities of liquid than the supplied quench which provides a particular advantage when the planar seals wear down and begin to leak. Such leakage may be detected visually in the outlet but may also be detected through, by way of example, conductivity measurements directly in the outlet before the pumped medium leaks out to the surroundings. With anticipated stiffened future environment and working environment laws, this is an extremely important and advantageous aspect of the invention.

The sealing arrangement of the invention is, as previously noted, preferably implemented in the form of a sealing dog that is effective for accomplishing pump and planar sealing in an efficient and reliable manner and which brings with it a number of significant advantages. First, all quench and leakage liquid or medium between 0 liters per minute and approximately 4 to 10 liters per minute can be readily removed from the atmosphere side of, for example, mechanical seals in a manner avoiding splashing of such liquids into the surroundings; this result can be attained for all rotational speeds from approximately zero to 3600 rpm.

Furthermore, as the secondary seal does not incorporate any parts that are moving one against the other, there is no need to supply quench liquid thereto for the purpose of lubricating the secondary seal itself. This enables the effective realization and use of, by way of example, interval flushing in the space outside of the mechanical seal, thereby radically reducing water consumption to less than one-percent of that utilized by prior art sealing arrangements.

Finally, the hereinabove-described forms of the invention in which the quench water or liquid is supplied directly to, or from a location close to, the primary mechanical seal (as for example FIG. 5) operatively requires relatively very little water—on the order of about 0.2 liters per minute at 1500 rpm—to cool and lubricate a mechanical seal that receives no liquid supply from the pump.

Thus, while there have been shown and described and pointed out fundamental novel features of the invention as applied to various preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A sealing dog for providing a mechanical planar seal about an operatively rotatable shaft, said sealing dog comprising:

a housing;

a primary mechanical planar seal defined by a seat member fixed to the housing and a confrontingly-opposed movable part located at a first position axially along the shaft for rotation with the shaft relative to said seat member and housing;

a secondary seal located at a second position axially along the shaft and axially spaced from said first position;

an inlet defined in said housing for admitting a flushing liquid into the housing and between said seat member and movable part for lubricating and cooling said primary seal;

a liquid collection chamber defined within said housing between said primary and secondary seals for receiving and collecting flushing liquid from said primary seal;

an outlet defined in said housing for discharging flushing liquid from within the housing;

a drain passage connecting said collection chamber and said outlet for communicating flushing liquid from the chamber to the outlet; and a predeterminately-configured wall disposed in said housing and dividing said collection chamber into a first portion and a second portion in liquid communication with each other and with said drain passage said wall extends substantially radially-inward from a radially-outward peripheral wall boundary of said chamber so as to divide said chamber into said first and second portions, said first portion being located axially proximate said primary seal and said second portion being located axially proximate said secondary seal.

2. A sealing dog in accordance with claim 1, wherein said wall has a screw spiral configuration and is disposed substantially coaxial with and closely-spaced about the shaft within and axially along said collection chamber.

3. A sealing dog in accordance with claim 1, wherein said inlet is defined in said housing proximate said primary seal.

4. A sealing dog in accordance with claim 1, wherein said first portion of the collection chamber is in liquid communication with said primary seal for receiving flushing liquid from the primary seal.

5. An arrangement for providing a mechanical planar seal about an operatively rotatable shaft, comprising:

a primary mechanical planar seal defined by a positionally-fixed seat member and a confrontingly-opposed movable part located at a first position axially along the shaft for rotation with the shaft and relative to said seat member;

a secondary seal located at a second position axially along the shaft and axially spaced from said first position;

means for directing a flushing liquid between said seat member and movable part for lubricating and cooling said primary seal;

a liquid collection chamber defined between said primary and secondary seals for receiving and collecting flushing liquid from said primary seal;

an outlet for discharging flushing liquid collected in said collection chamber;

a drain passage connecting said collection chamber and said outlet for communicating flushing liquid from the chamber to the outlet; and a predeterminately-configured wall dividing said collection chamber into a first portion and a second portion in liquid communication with each other and with said drain passage said wall extends substantially radially-inward from a radially-outward peripheral wall boundary of said chamber so as to divide said chamber into said first and second portions, said first portion being located axially proximate said primary seal and said second portion being located axially proximate said secondary seal.

* * * * *